United States Patent [19]

Nagira et al.

[11] Patent Number: 4,675,700

[45] Date of Patent: Jun. 23, 1987

[54] THERMAL PRINTER

[75] Inventors: Keiji Nagira, Kawasaki; Hiroshi Fukui, Yokosuka, both of Japan

[73] Assignee: Canon Kabushiki Kaisha, Tokyo, Japan

[21] Appl. No.: 844,868

[22] Filed: Mar. 27, 1986

[30] Foreign Application Priority Data

| | | | |
|---|---|---|---|
| Apr. 1, 1985 | [JP] | Japan | 60-66546 |
| Apr. 1, 1985 | [JP] | Japan | 60-66547 |
| Apr. 22, 1985 | [JP] | Japan | 60-84451 |

[51] Int. Cl.[4] .............................................. G01D 15/10

[52] U.S. Cl. ................................ 346/76 PH; 400/120

[58] Field of Search ......................... 346/76 PH, 76 R; 250/318, 317.1; 364/519; 219/216 PH; 400/120

[56] References Cited

U.S. PATENT DOCUMENTS

| | | | |
|---|---|---|---|
| 4,079,824 | 3/1978 | Ku | 197/1 R |
| 4,090,059 | 5/1978 | Kilby et al. | 219/216 |
| 4,140,406 | 2/1979 | Wolf et al. | 400/124 |
| 4,407,003 | 9/1983 | Fukui | 346/76 PH |
| 4,431,319 | 1/1984 | Karaki et al. | 400/124 |
| 4,453,167 | 6/1984 | Motoyoshi | 346/76 PH |
| 4,479,132 | 10/1984 | Iwakura | 346/76 PH |
| 4,492,965 | 1/1985 | Ohnishi et al. | 346/1.1 |
| 4,494,126 | 1/1985 | Todoh | 346/76 PH |
| 4,510,505 | 4/1985 | Fukui | 346/76 PH |
| 4,528,572 | 7/1985 | Sasaki et al. | 346/76 PH |
| 4,559,542 | 12/1985 | Mita | 346/76 PH |

FOREIGN PATENT DOCUMENTS

| | | | |
|---|---|---|---|
| 51-36074 | 10/1976 | Japan | 346/76 PH |
| 55-11878 | 1/1980 | Japan | 346/76 PH |
| 57-185168 | 11/1982 | Japan | 346/76 PH |
| 58-212970 | 12/1983 | Japan | 346/76 PH |

OTHER PUBLICATIONS

*IBM Technical Bulletin,* "Low-Cost Thermal Printer", vol. 21, No. 1, Jun. 1978, pp. 284-285, Cutshall, et al.

*IBM Technical Bulletin,* "Digital Color Printer", vol. 21, No. 5, Oct. 1978, pp. 1828-1829, Skinner, et al.

*Primary Examiner*—Arthur G. Evans

*Attorney, Agent, or Firm*—Fitzpatrick, Cella, Harper & Scinto

[57] ABSTRACT

A thermal printer records an image on a recording sheet by transferring the ink of an ink sheet. The printer has a printing head provided with a first heating element group composed of an array of plural heating elements and a second heating element group composed of an array of plural heating elements, a control system for controlling the amount of heat generated by two groups in consideration of the heat accumulated in the ink sheet, and a driving system for causing relative movement of the recording sheet and the printing head.

17 Claims, 20 Drawing Figures

THERMAL PRINTER

BACKGROUND OF THE INVENTION

1. Field of the Invention

The present invention relates to a thermal printer for image recording on a recording sheet by transferring the ink of an ink sheet to said recording sheet, and is applicable for example in personal computers, word processors, electronic typewriters, facsimiles and so-called printers which record an image on a recording sheet, corresponding to information stored in a memory.

2. Related Background Art

In general, conventional thermal printer has a thermal head containing an array of plural heating elements, and achieves image recording by selectively driving said heating elements while the head is moved, thereby fusing the ink of a thermal transfer ribbon in succession and transferring the ink onto a recording meidum. Such a thermal printer is widely employed as an output device for example in a word processor, as it is compact and light, allows easy maintenance, generates little noise and provides a recording with good preservability.

However, such a thermal printer is associated with a lower recording speed in comparison with wire dot printers or ink jet printers, because, in the thermal printer, the thermal head has to be prevented from overheating for obtaining a satisfactory quality of recording, as will be explained in more detail. For this purpose, in addition to usual heat radiating plate, there is generally provided a cooling period between the driving period of the heating elements. Such cooling period inevitably lowers the recording speed of the thermal printer.

FIG. 1 shows the structure of a conventional thermal head, wherein heating elements 1 are provided on a glaze layer 3 on a substrate 2 and connected at one ends thereof to a common electrode 4 and at the other ends to respective driving electrodes 5.

In addition to the linear array head shown in FIG. 1, there is also known a head having heating elements arranged in a matrix for example $5\times7$. However, such a matrix head is not widely utilized as it requires formation of plural thin layers in contrast to one thin layer formation in the linear array head, and it generally results in a higher cost due to a more complex arrangement of signal lines.

In such a linear array head, the recording is achieved by moving said thermal head in the horizontal direction and applying heating pulses to respective heating elements, but the aforementioned cooling period cannot be made long enough to allow high-speed recording.

In such high-speed recording, the heating pulses are almost continuously supplied to the elements, thus elevating the temperature thereof.

Overheating of the heating elements is undersirable as it not only accelerates deterioration of the elements but also significantly reduces the image quality. Consequently it is difficult to achieve a high recording speed with such a linear array head as the interval of driving is limited by such overheating phenomenon.

In consideration of the foregoing, there has already been proposed a head with two linear arrays of heating elements as shown in FIGS. 2(A) and 2(B). In the structure shown in FIG. 2(A), there are provided two linear arrays A, B of heating elements, symmetrical with the center line of the substrate 2. The elements of the arrays A, B are composed of the same materials as explained before and are represented by the same numbers, with suffixes A, B, in FIG. 2.

The structure shown in FIG. 2(A) has an electrode 4 common to the arrays A and B, and can be prepared with a planar structure substantially the same as that of the linear array head.

On the other hand, FIG. 2(B) shows another thermal head, provided with linear arrays A, B of seven heating elements each. The heating elements are connected at one side thereof to signal electrodes 5A or 5B, and at the other side to a common electrode 4A or 4B. Said heating elements, signal electrodes and common electrodes are provided on the substrate 2, and the heating elements 1A, 1B are provided on a partial glaze layers 3A, 3B formed on the substrate 2.

The thermal head shown in FIG. 2(A) or 2(B), when pressed against a recording sheet 15 on a platen 14 across a thermal transfer ribbon 16 as shown in FIG. 3, can form a doubled number of dots, in comparison with the linear array head, at a head position, if the heads of the arrays A and B are simultaneously driven. Consequently, such a head can achieve a doubled recording speed in comparison with the linear array head.

However, such a thermal head with two linear arrays is associated with a lower print quality in comparison with the thermal head with one array, because of the following considerations. In a recording operation as depicted in FIG. 3, with the head movement in a particular direction in the thermal transfer ribbon 16 is at first heated at the position of the array A, and stores a certain amount of heat when it reaches the position of the array B, positioned downstream in the recording direction.

Consequently the dots obtained with the array B are always denser and larger than those obtained in the array A. Consequently, the quality of printed image is deteriorated due to alternating dot densities between odd and even columns.

SUMMARY OF THE INVENTION

In consideration of the foregoing, an object of the present invention is to provide a thermal printer with improved print quality.

Another object of the present invention is to provide a thermal printer with improved printing speed.

Still another object of the present invention is to provide a thermal printer capable of providing improved print quality despite of improved printing speed.

Still another object of the present invention is to provide a thermal printer capable of maintaining a constant density in the printed image.

Still another object of the present invention is to provide a thermal printer capable of satisfactory image recording with a thermal head provided with plural arrays of heating elements.

Still another object of the present invention is to provide a thermal printer capable of controlling the amount of heat generated by plural arrays of heating elements in consideration of the amount of heat accumulated in the ink sheet.

The foregoing objects can be achieved, according to the present invention, by a thermal printer comprising:

a head comprising a first heating element group composed of an array of plural heating elements and a second heating element group composed of an array of plural heating elements;

control means for controlling the amount of heat generated by the first and second heating element groups in consideration of the amount of heat accumulated in an ink sheet; and moving means for causing a relative movement of a recording sheet and the head.

Also these objects can be achieved, according to the present invention, by a thermal printer comprising:

a head comprising a first heating element group composed of an array of plural heating elements and a second heating element gorup composed of an array of plural heating elements;

drive means for driving the first and second heating element groups; and moving means for causing a relative movement of a recording sheet and the head;

wherein one of the first and second heating element groups, positioned upstream in the recording direction, has a higher resistance than that of the other group positioned downstream in the recording direction.

DESCRIPTION OF THE PREFERRED EMBODIMENTS

Now the present invention will be clarified in detail by embodiments thereof shown in the attached drawings.

Figure 1:
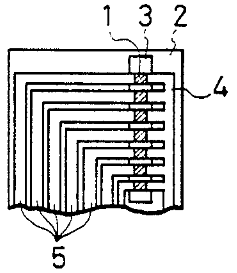
FIG. 1 PRIOR ART
FIG. 1 is a schematic front view of a conventional thermal head.
Figure 2A:
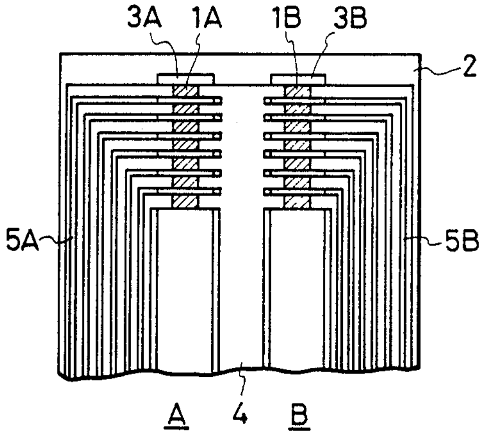
FIG. 2A PRIOR ART
FIGS. 2(A) and 2(B) are schematic front views of the thermal heads having two arrays of heating elements.
Figure 2B:
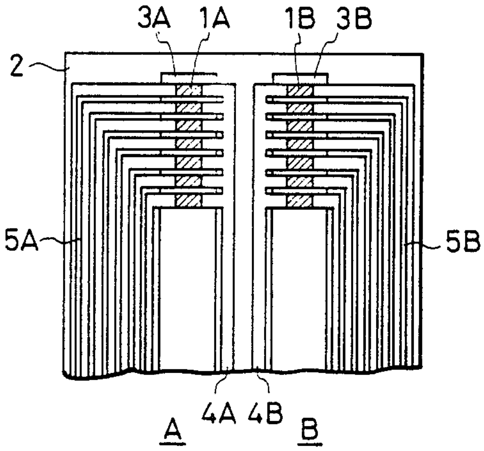
FIG. 2B PRIOR ART
Figure 3:
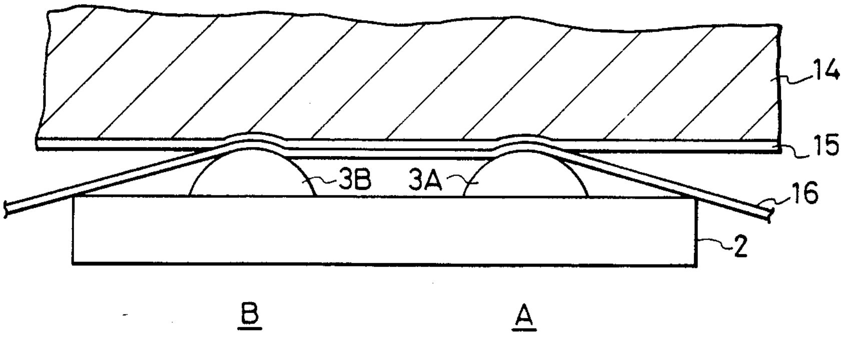
FIG. 3 PRIOR ART
FIG. 3 is a plan view of the thermla heads shown in FIGS. 2(A) and 2(B)
Figure 4:
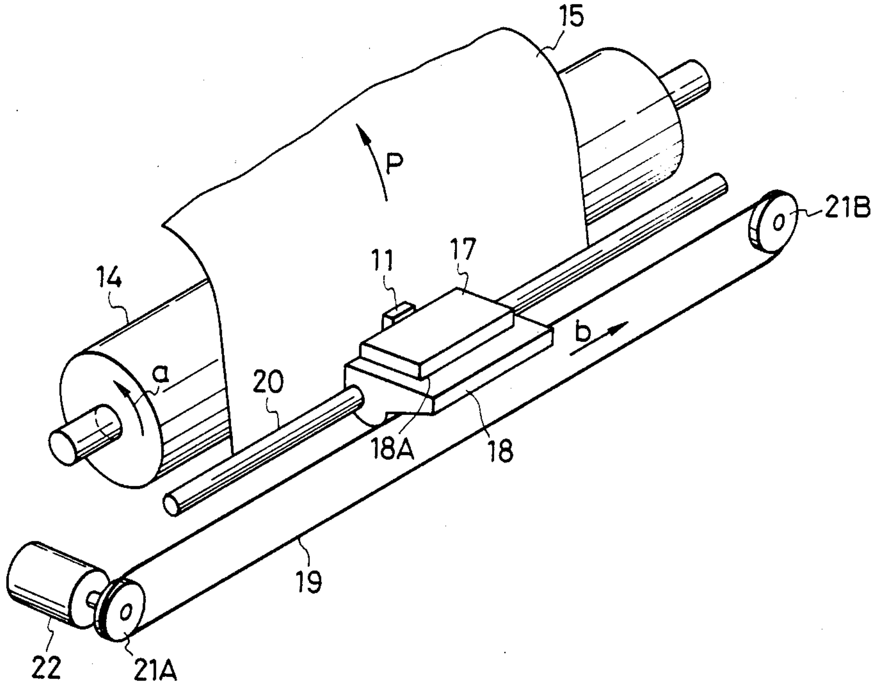
FIG. 4 is a perspective view of a thermal transfer printer constituting an embodiment of the present invention.

FIG. 4 is a perspective view of a thermal printer constituting an embodiment of the present invention, wherein a thermal recording head 11 is provided with two arrays of heating elements as shown in FIGS. 2 and 3. The recording head 11 is slidably supported by a guide bar 20, and is reciprocated along a cylindrical platen 14, by means of a wire 19 supported by pulleys 21A, 21B and driven by a stepping motor 22. In the recording operation on a recording sheet 15, the main scanning is achieved by the movement of a carriage 18, while the sub-scanning is achieved by moving the recording sheet 15 in a direction P, by the platen 14 which is rotated in a direction a by a motor 35 to be explained later.

The recording head 11 is rendered movable between a head-down position in which the head 11 is in contact with the recording sheet 15, and a head-up position in which the head 11 is separated therefrom, by means of a motor 36 to be explained later. In this manner the recording head 11 presses the recording sheet 15 across the thermal transfer ribbon 16 at the recording oepration. The ribbon 16 is housed in a cassette 17 which is detachably loaded in a loading position 18A of the carriage 18.

The ribbon 16 is advanced from an unrepresented feed pulley to an unrepresented take-up pulley provided in the cassette 17, in synchronization with the movement of the carriage 18, wherein the take-up pulley is driven by the motor 37.

Figure 5:
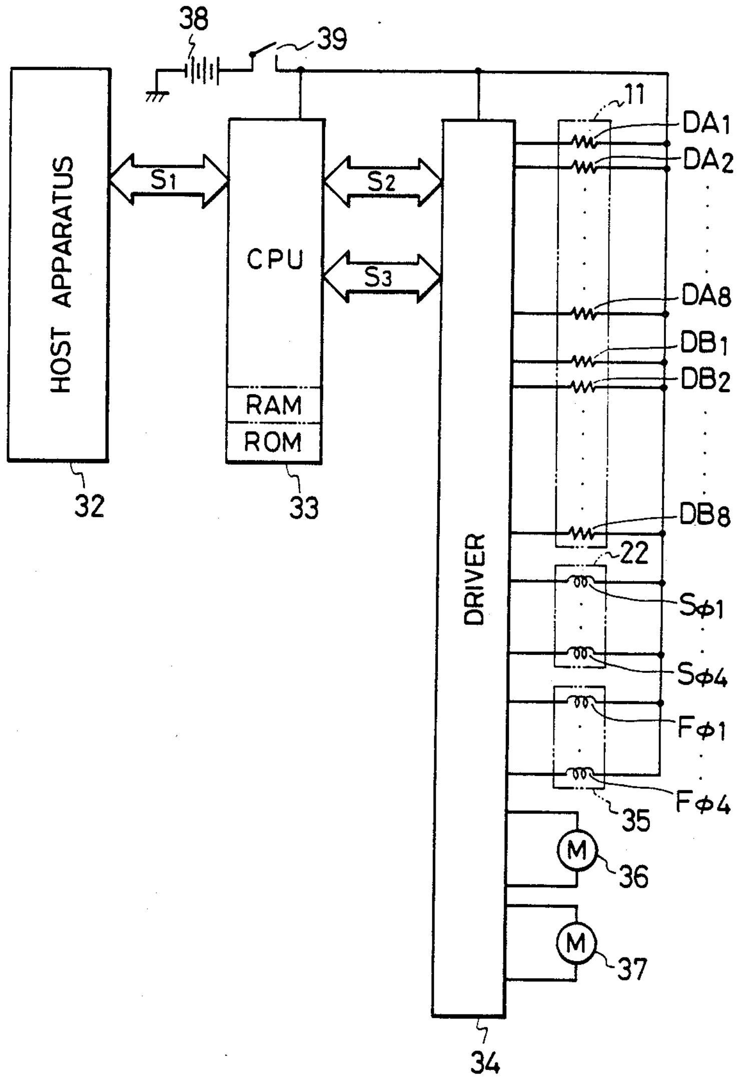
FIG. 5 is a block diagram showing a control system of the printer shown in FIG. 4.
Figure 7:
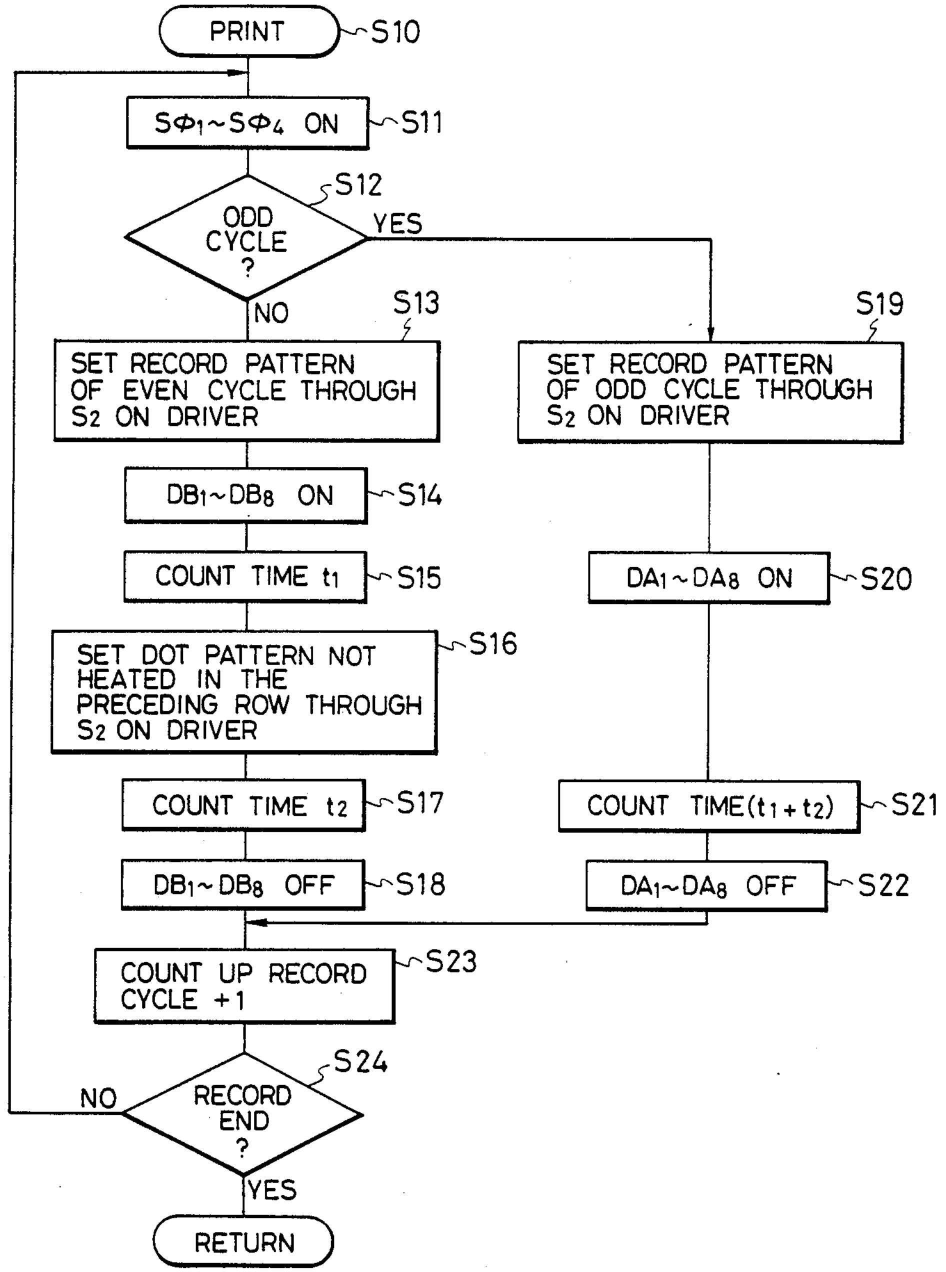
FIG. 7 is a flow chart showing the control procedure of the CPU shown in FIG. 5.

FIG. 5 is a block diagram of a circuit for controlling the printer shown in FIG. 4. In FIG. 5, a host device 32, such as a facsimile, a word processor or a personal computer sends the data of characters or image to be recorded to a central processing unit (CPU) 33 of a recording unit through a signal line S1. The CPU is composed of a one-chip device, incorporating a random access memory (RAM) employed for example as a buffer memory, and a read-only memory (ROM) for example as shown in FIG. 7 for storing a program. The CPU 33 supplies, through signal lines S2, S3, a drive signal to a driver 34 which controls the recording head 11, stepping motor 22 for carriage movement, stepping motor 35 for sheet advancement, motor 36 for shifting the thermal transfer ribbon 16 and motor 37 for taking up the thermal transfer ribbon 16. The driver 34 converts the drive signals of a logic level from the CPU 33 into a level required for driving heating elements DA1–DA8 and DB1–DB8. The driving currents for the elements are supplied from a power source 38 through a power switch 39.

In the present embodiment, the recording head 11 is provided with the heating elements DA1–DA8, DB1–DB8 divided in the groups of 8 elements. The symbols A and B respectively correspond to the arrays A and B shown in FIG. 3. The stepping motor 22 for moving the carriage 18 and the stepping motor 35 for sheet advancement are 4-phase stepping motors, respectively with exciting phases Sϕ1–Sϕ4 and Fϕ1–Fϕ4. The motors 36, 37 for the ribbon 16 can be DC motors or stepping motors.

The host unit 32 supplies the CPU 33 with data to be recorded and control codes such as carriage return and line feed, through the signal line S1, and the CPU 33 executes the recording operation by controlling the recording head 11 and the motors through the driver 34.

Figure 6A:
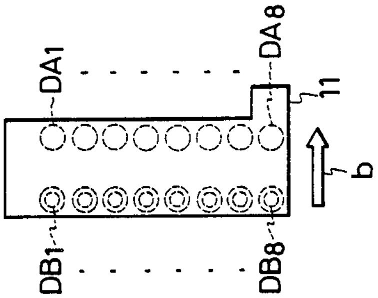
FIG. 6(A) is a plan view, with the interior, of a thermal head.

FIG. 6(A) is a plan view of the recording head 11, seen from the rear side thereof and indicating the positions of the heating elements DA1–DA8, DB1–DB8 in broken-lined circles, wherein the heating elements DB1–DB8, positioned upstream in the recording direction b, are represented by double circles.

Figure 6B:
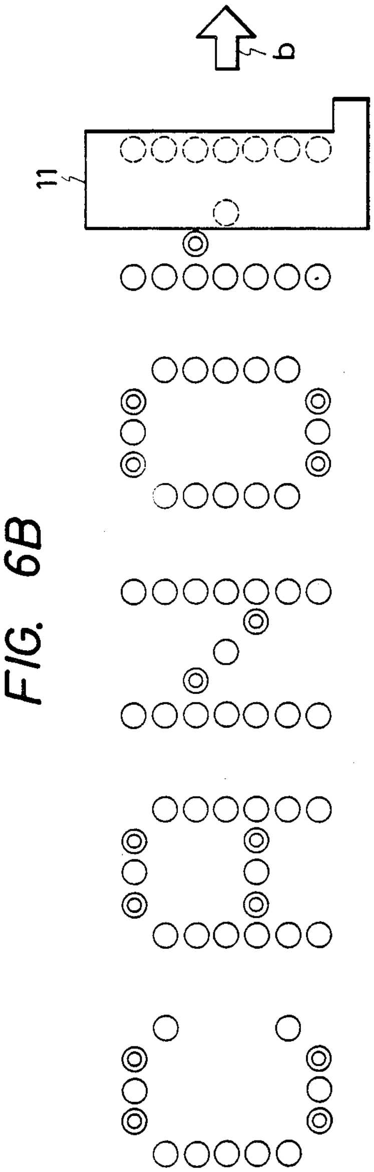
FIG. 6(B) is a schematic view showing the recording operation with the head shown in FIG. 6(A)

FIG. 6(B) shows a dot arrangement for the case of printing the letters "CANON" with the above-explained recording head 11, in which single circles indicate dots recorded by the heating elements DA1--

DA8, while double circles indicate those by the elements DB1–DB8. In this manner the dots in odd columns are recorded by the elements DA1–DA8, and those in even columns are recorded by the elements DB1–DB8. However, the neighboring columns are not recorded in succession, since two arrays of the heating element are mutually spaced by a space corresponding to a dot, as shown in FIG. 6(A).

Figure 8:
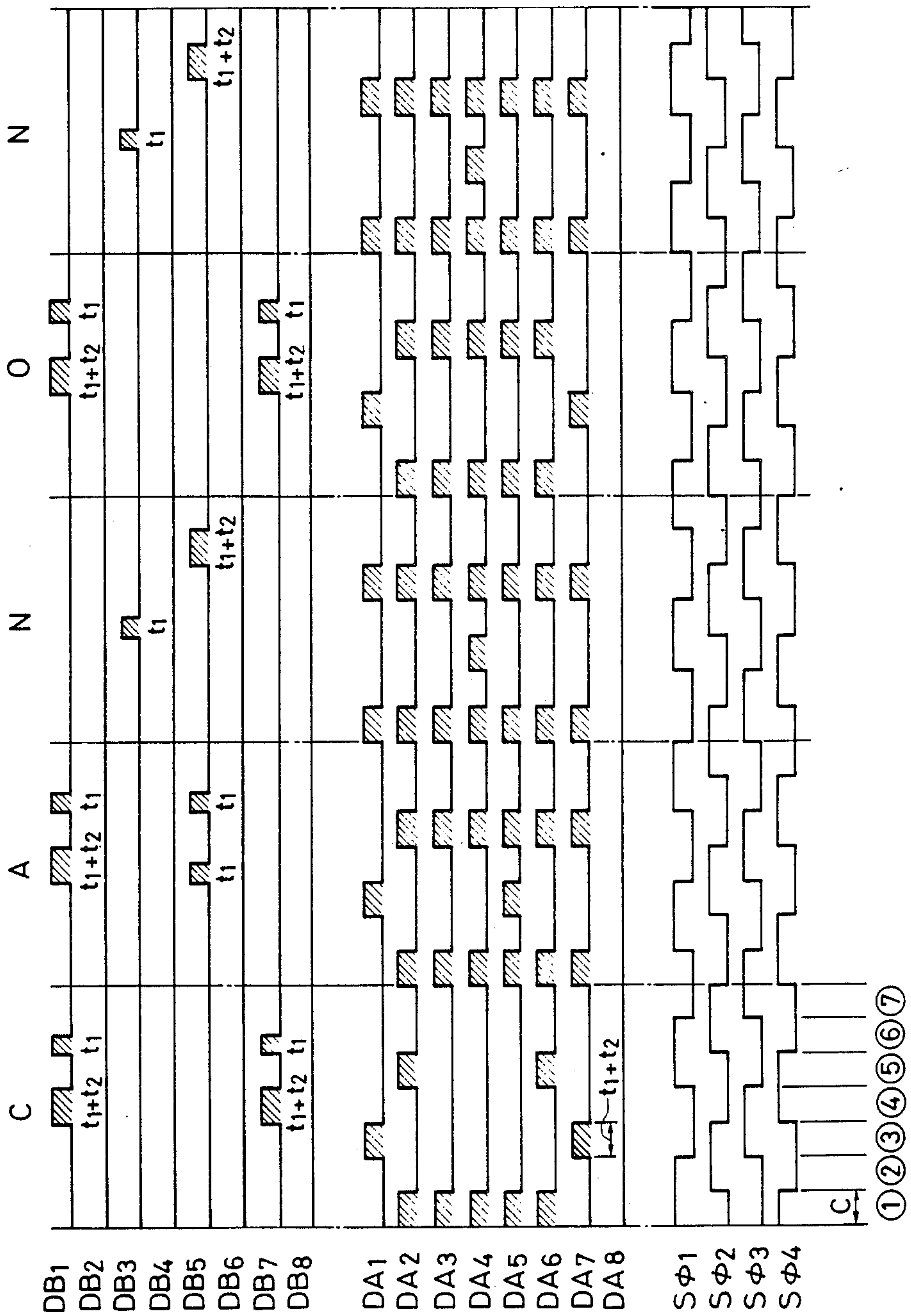
FIG. 8 is a timing chart showing the function in case of recording characters shown in FIG. 6(B)

Now reference is made to a flow chart shown in FIG. 7 and a timing chart shown in FIG. 8 for explaining the function of the above-explained circuit.

FIG. 7 is a flow chart of recording control executed by the CPU 33. In a step S10, the host unit 32 supplies recording data and control data through the signal line S1. When a recording buffer is filled to complete the preparation for recording, the CPU 33 sets, in a step S11, the magnetizing direction of the phases S$\phi$1–S$\phi$4 of the stepping motor 22 in such a manner that the carriage 18 moves to the right, i.e. in the recording direction b shown in FIG. 4. A succeeding step S12 identifies whether the recording cycle is positioned at an odd cycle or an even cycle.

In FIG. 8, a recording cycle is represented by C. The four lowermost curves in FIG. 8 represent drive signals for the four phases of the stepping motor 22. The stepping motor 22 is subjected thus to 2-phase drive, and the recording cycle C corresponds to a period in which the carriage 18 is stopped at a position between the phase switchings.

In FIG. 8, curves DA1–DA8 and DB1–DB8 show the drive timings of corresponding heating elements. Chain lines in FIG. 8 define the recording operations of characters, and each character is recorded by seven recording cycles, with seven different carriage positions.

In case a step S12 in FIG. 7 identifies an odd cycle, the program proceeds to a step S19 to set a recording pattern of an odd cycle in the driver 34 through the signal line S2. In the example shown in FIG. 6, the data of vertical five dots in the initial column of the first character "C" are set for the heating elements DA1–DA8. Thus, in said recording cycle, the heating elements DA2–DA6 are activated.

In a succeeding step S20, the heating elements DA1–DA8 are given heating pulses which continue until the expiration, in a step S21, of the sum of a time measured by a timer t1 and a time measured by a timer t2. The time measured by said timers t1 and t2 is selected, as shown in FIG. 8, equal to the period in which the carriage 18 is stopped at a position. When the timers t1 and t2 complete time-counting operations, a step S22 terminates the heating pulses to the heating elements DA1–DA8, and the program proceeds to a step S23.

The step S23 stepwisely advances the count of a cycle counter for counting the recording cycle. A succeeding step S24 identifies whether all the data in the print buffer are recorded, and, if not, the program returns to the step S11.

On the other hand, if the step S12 identifies an even recording cycle, the step S13 sets a recording pattern of an even cycle in the driver 34 through the signal line S2. Then a step S14 supplies heating pulses to the heating elements DB1–DB8, and a step S15 continues the operation during a period measured by the timer t1. Then a step S16 sets only the dots that are not printed in the preceding column, and activates the timer t2. The heating pulses are continued until the timer t2 expires in a step S17, and, upon said expiration, a step S18 terminates the heating pulses to the heating elements DB1–DB8. The duration t2 of the heating pulses to the heating elements DB1–DB8 corresponds to a drive time, required by the thermal transfer ribbon 16, which is already heated in the vicinity of the element DA1–DA8 and has accumulated a certain amount of heat.

The characters "CANON" shown in FIG. 6(B) can therefore be recorded by repeating the above-described procedure. In this procedure the dots indicated by double circles in the even columns are recorded by the elements DB1–DB8, with a recording period shorter than that for the elements DA1–DA8, as shown in FIG. 8. In this manner, there is achieved a compensation for the heat accumulated by the heating elements DA1–DA8 positioned upstream in the recording direction, so that the density of the even column dots obtained by the elements DB1–DB8 becomes equal to that obtained with the elements DA1–DA8.

As will be seen in FIG. 6(B) and FIG. 8, the elements DA1–DA8 and DB1–DB8 are mutually separated by a distance of one dot, so that the mutually neighboring even and odd dots are not recorded in the same odd or even cycle. As shown in FIG. 8, the dots of the first double circles are recorded in the third cycle from the recording of the dots in the first column.

Figure 9:
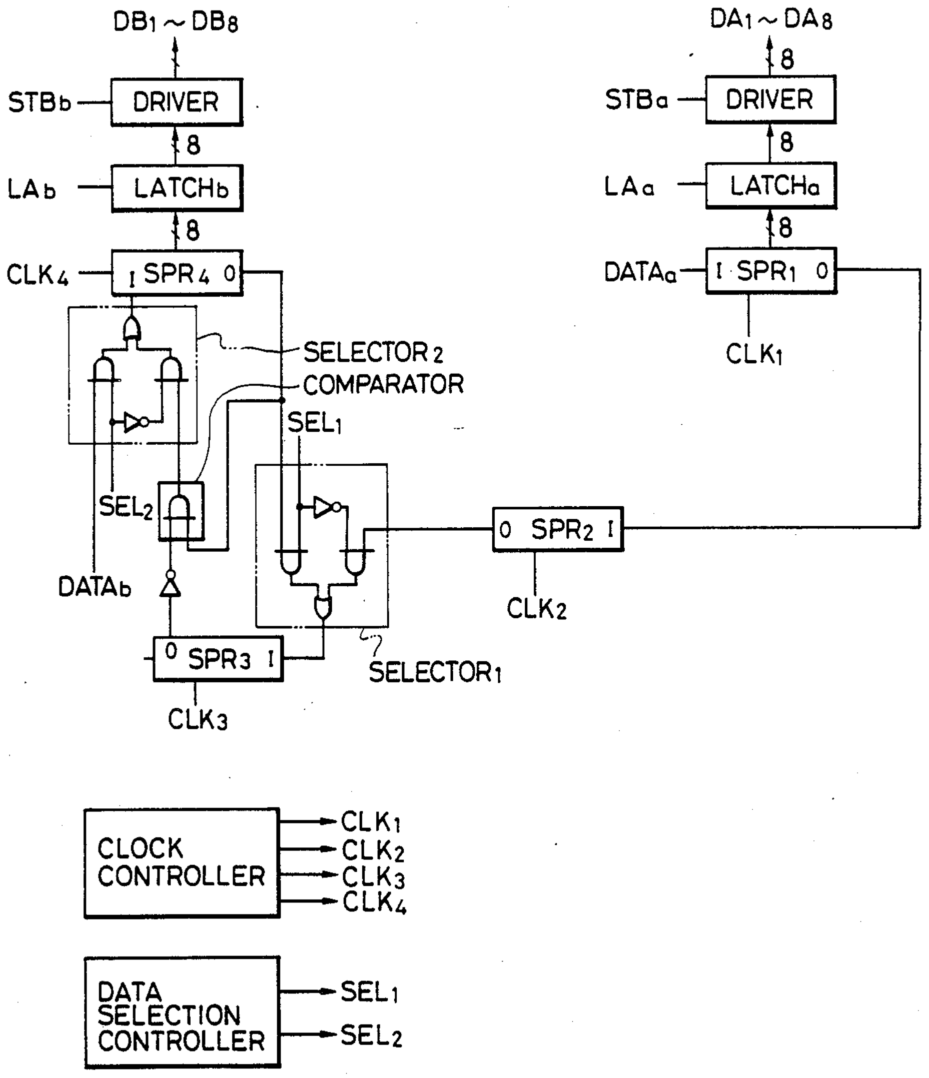
FIG. 9 is a block diagram of a thermal hysteresis unit.

Now reference is made to FIG. 9 for explaining a thermal hysteresis unit.

In an embodiment explained in the following, there is provided means for storing the thermal hysteresis of the preceding column, and the duration of heating pulses to the heating elements of the succeeding column is controlled according to the presence of absence of dots in the preceding dot column.

In FIG. 9 there are shown probe signals STB to be directly supplied to the thermal recording head; a signal LA for latching data; a shift register SPR1 for storing data to be recorded by the heating elements DA1–DA8 of an odd-numbered column; a buffer shift register SPR2 for an odd-numbered column; a shift register SPR3 for storing data recorded in an odd-numbered column; and a shift register SPR4 for storing data to be printed by the elements DB1–DB8 in an even-numbered column.

A clock controller generates respectively controllable clock signals CLK1–CLK4, and a data selection controller generates signals SEL1, SEL2 for controlling the signal path for storing print data in the shift registers.

At the initial setting, data "0" are stored in the shift registers SPR1, SPR2, SPR3 and SPR4 by turning on and off the signals CLK1–CLK4 and SEL1, SEL2.

Now reference is made to FIG. 8 for explaining the method of hysteresis control in the actual printing operation.

In an odd-numbered cycle (1), the clock controller and the data selection controller select a state CLK1="ON", CLK2="OFF", CLK3="OFF", CLK4- "OFF", SEL1="L" and SEL2="L", whereby eight print-data to be printed in an odd-numbered cycle (1) are sent from DATAa in synchronization with clock signals. In this manner the data to be printed in the odd-numbered cycle (1) are stored in the register SPR1, and the signal LAa is turned on to latch said data in the register LATCHa. Then the heat generation of the odd-numbered cycle (1) is completed by turning on the signal STB2 for a period t1+t2.

In an even-numbered print cycle (2), the clock controller and the data selection controller select a state CLK1="ON", CLK2="ON", CLK3="ON", CLK4="ON", SEL1="L" and SEL2="H", whereby eight data to be printed in the even-numbered cycle (2) in the even-numbered cycle (2) are supplied in synchronization from DATAb, and simultaneously the print data stored in the registers SPR1, SPR2 are shifted to the registers SPR2, SPR3. In this manner the print data to be printed in the even-numbered cycle (2) are stored in the register SPR4, and the signal LAb is turned on to store the print data in the LATCHb. Subsequently the signal STBb is turned on for a determined period t1.

Then the clock controller and the data selection controller select a state CLK1="OFF", CLK2="OFF", CLK3="ON", CLK4="ON", SEL1="H" and SEL2="L" to obtain a logic product of the data which are stored in the SPR4 and have been printed in the preceding heating cycle and the data which are stored in the SPR3 and were not printed in the preceding column A, whereby the SPR4 receives, among the dot data to be printed, only those that were not printed in the preceding column A. Then the signal LAb is turned on to latch the print data in the LATCHb. Subsequently the signal STBb is turned on for a determined period t2 to complete the heat generation in the even-numbered cycle (2).

A comparison of the dot data used for heat generation in the preceding column A and the print data for the succeeding column B is conducted by executing the above-explained procedure in succession for an odd-numbered cycle and an even-numbered cycle.

As explained in the foregoing, a thermal transfer printer of the foregoing embodiment for thermal transfer recording with plural arrays of heating elements is provided with means for independently controlling the drive time of the downstream and upstream arrays thereby removing the unevenness in the print density caused by heat accumulation in the thermal transfer ribbon, and still enabling high-speed recording.

Figure 10:
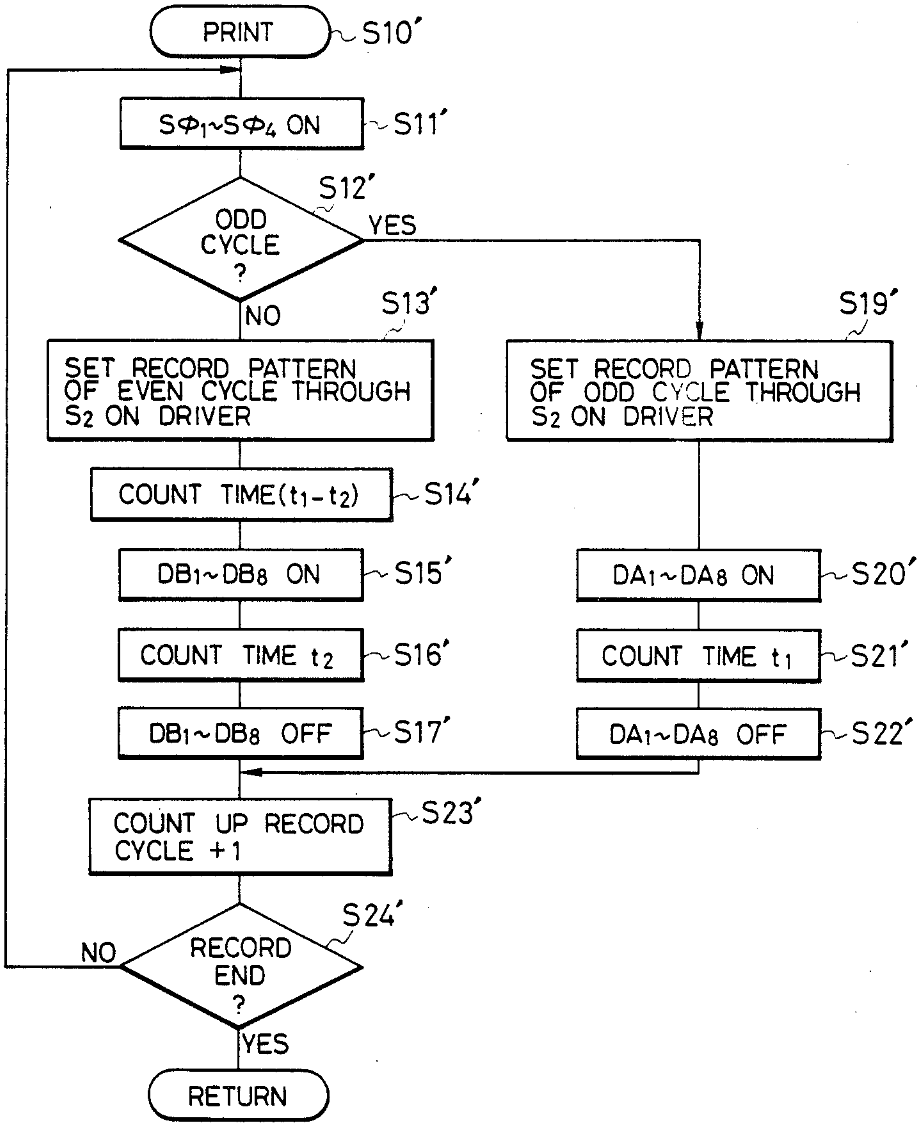
FIG. 10 is a flow chart of another embodiment.
Figure 11:
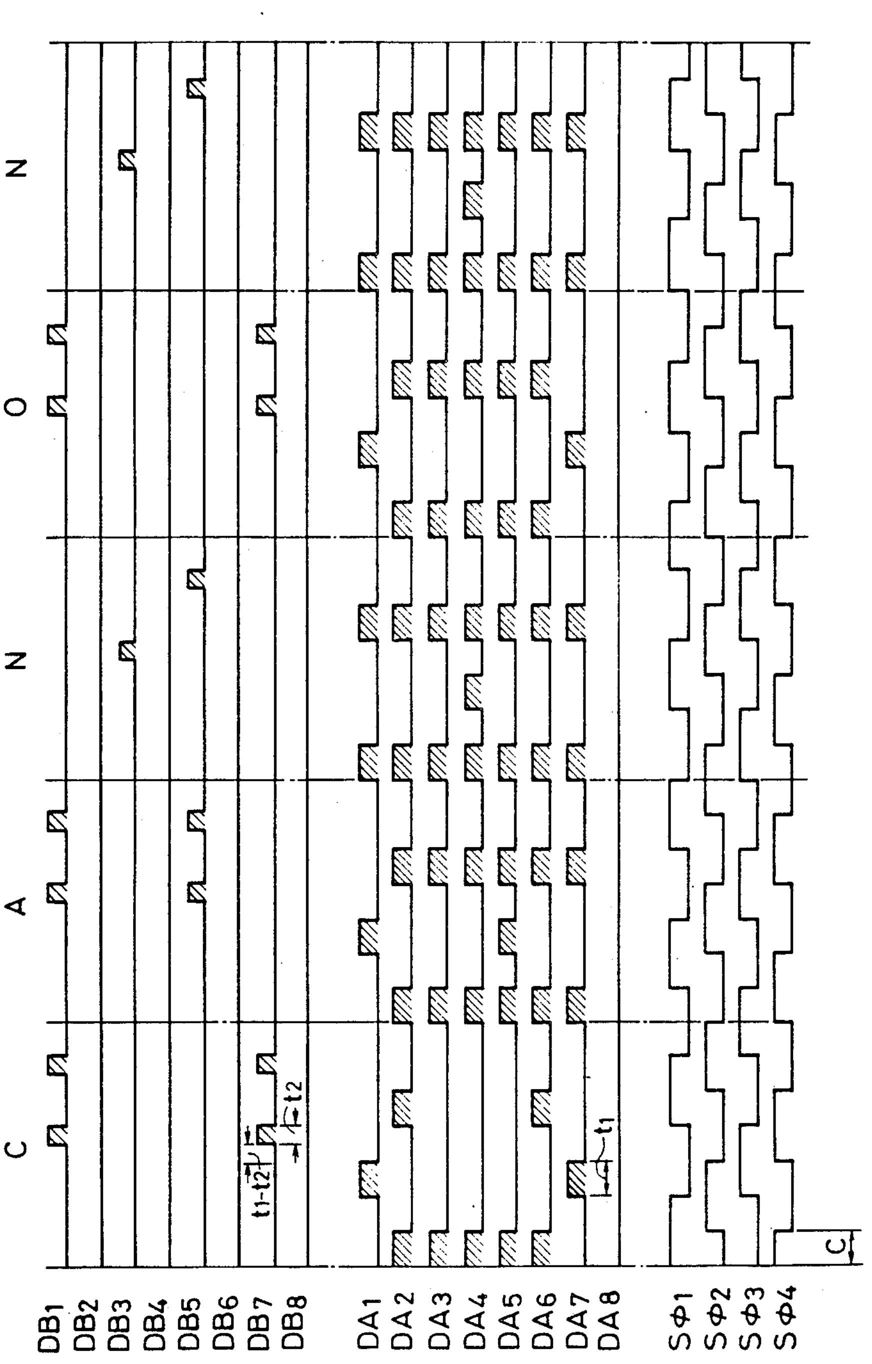
FIG. 11 is a corresponding timing chart.

Now reference is made to FIGS. 10 and 11 for explaining a modification of the record control shown in FIGS. 7 and 8.

At first, there will be explained a case of an odd-numbered cycle.

In case a step S12' in FIG. 10 identifies an odd-numbered cycle, program proceeds to a step S19' for setting a record pattern of the odd-numbered cycle in the driver 34 through the signal line S2. In the example shown in FIG. 6, data of first five vertical dots of the first character "C" are set for the heating elements DA1–DA8. Consequently, the heating elements DA2–DA6 are activated in this recording cycle.

A succeeding step S20' supplies the heating elements DA1–DA8 with heating pulses, which are continued until the timer 2 completes the time-measuring operation in a step S21'. As shown in FIG. 11, the period t1 measured by the timer corresponds to the period in which the carriage 18 is stopped at a position. Upon expiration of the period t1, a step S21' terminates the heating pulses for the heating elements DA1–DA8.

Then a step S23' steps up the cycle counter for counting the number of recording cycles, and a step S24' identifies whether all the data in the print buffer are printed. If not, the program returns to the step S11'.

On the other hand, in case the step S12' identifies an even-numbered cycle, a step S13' sets a record pattern of the even-numbered cycle in the driver 34 through the signal line S2, and a step S14' delays the operation by a period corresponding to the difference between the time measured by the timer t1 and that measured by the timer t2. Subsequently a step S15' supplies the heating elements DB1–DB8 with heating pulses, which are continued until the timer t2 completes the time-measuring operation in a step S16'. Upon completion of the time-measuring operation of the timer t2, a step S17' terminates the heating pulses to the elements DB1–DB8. The duration t2 of the heating pulses for the heating elements DB1–DB8 is determined by subtracting, from the period t1, a drive period corresponding to the amount of heat accumulated in the ribbon by heating in the vicinity of the heating elements DA1–DA8. The delay in the step S14' is for compensating said reduction in the driving period, thus enabling the activation of the heating elements DB1–DB8 within a recording cycle.

Now reference is made to FIGS. 12 to 15 for explaining still another embodiment.

The following embodiment provides a thermal printer utilizing a thermal recording head having plural arrays of heating elements, capable of achieving a uniform recording by regulating the drive voltage for the heating elements of each array.

Figure 12:
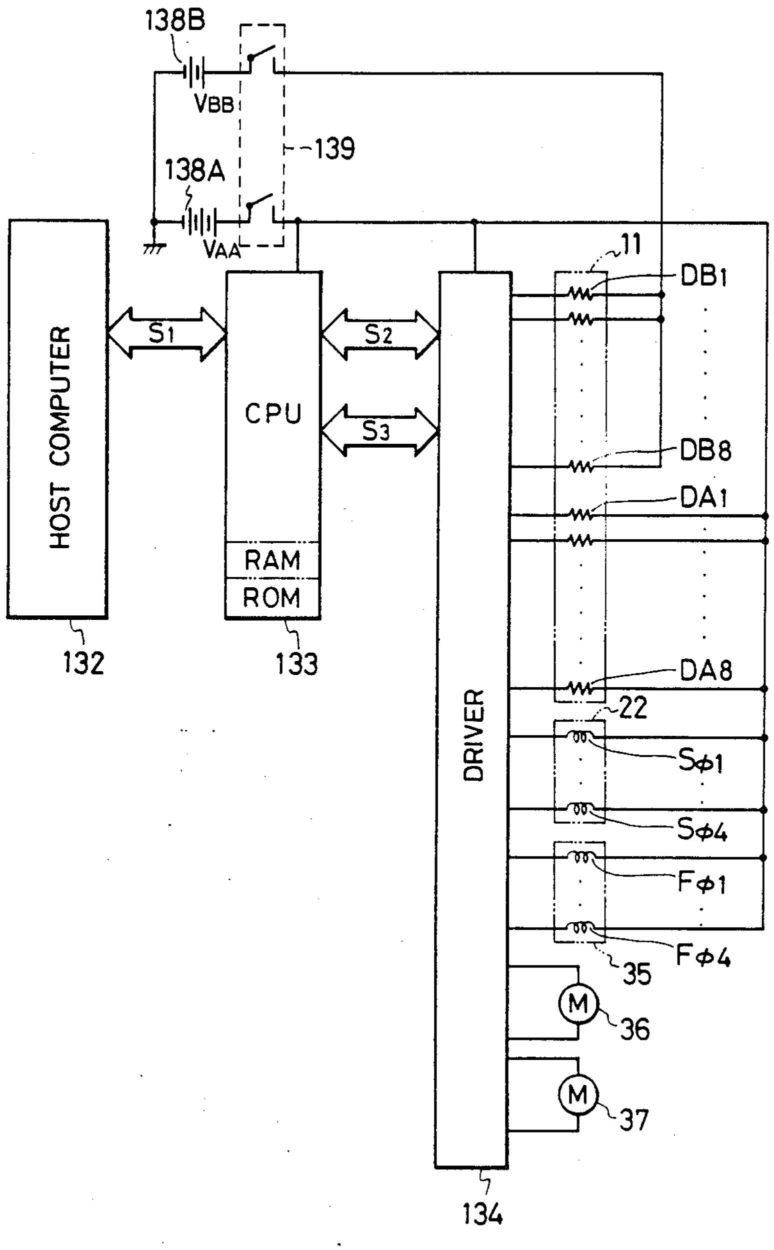
FIG. 12 is a block diagram of still another embodiment.

FIG. 12 is a schematic block diagram of a control system for controlling the thermal printer of the present embodiment, wherein a host computer 132 and a central processing unit (CPU) 133 are connected to a control signal line S1, and a driver 134 is controlled by the CPU 133 through control signal lines S2, S3. In response to control signals supplied from the CPU 133, the driver 134 controls a recording head 11, stepping motor 22 for driving a carriage 18, a stepping motor 35 for sheet advancement, a DC motor 36 for elevating or lowering an ink ribbon 16, and a DC motor 37 for taking up the ink ribbon 16. The driver 134 generates various drive signals in response to signal from the CPU 133. The heating elements DB1–DB8 are powered by a power source 138B through a power switch 139, and the heating elements DA1–DA8 are powered by a power source 138A through a power switch 139. The drive signals from the driver 134 drive the carriage driving stepping motor 22 by magnetizing the phases Sϕ1–Sϕ4 in succession, also drive the sheet advancing motor 35 by the phases Fϕ1–Fϕ4 thereof, and further drive the motors 36, 37 for shifting and taking up the ribbon 16.

The CPU 133, incorporated in the thermal printer for controlling the driver 134 in response to data signals, is provided with a read-only memory (ROM) for recording operation control, and a random access memory (RAM) utilized as a heat cycle counter, a print buffer, etc.

In the following there will be given an explanation on the above-explained thermal printer, while making reference to FIG. 13.

Figure 13:
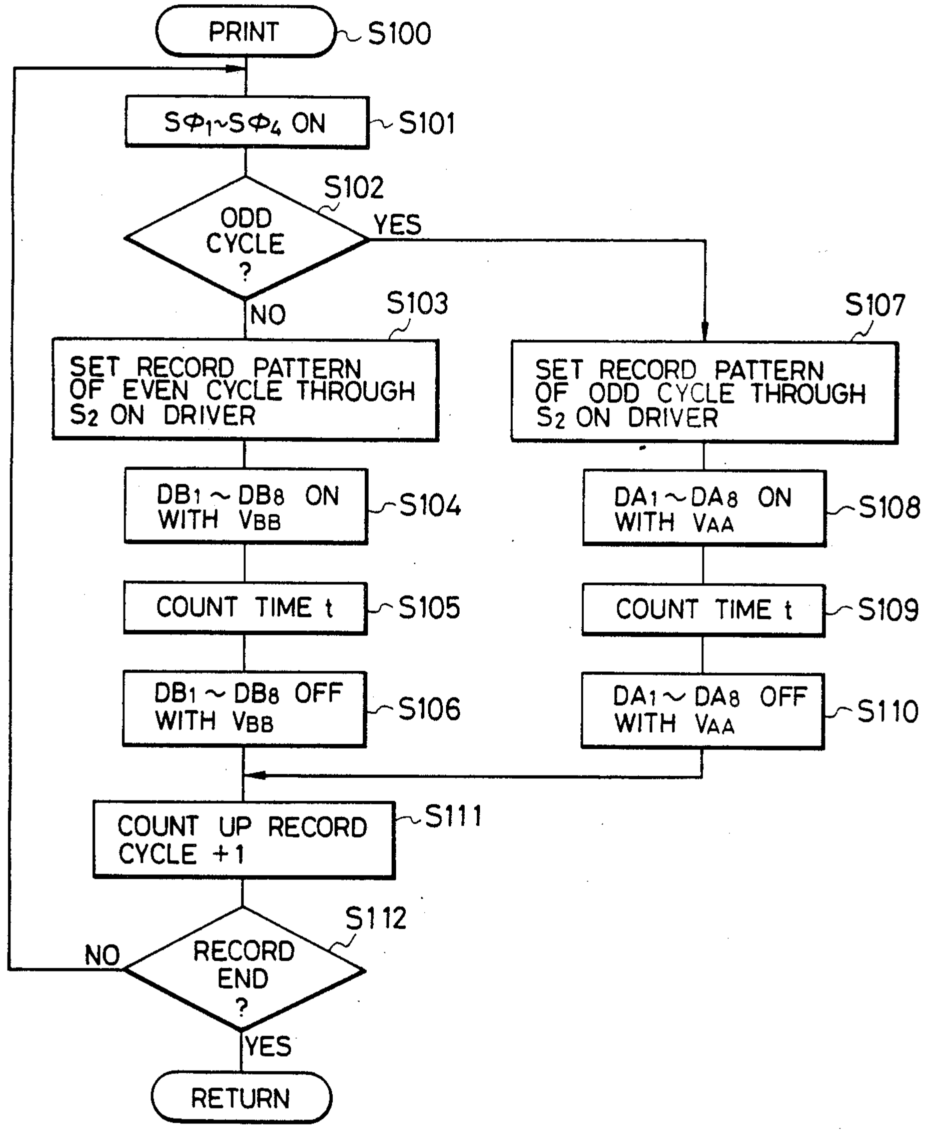
FIG. 13 is a corresponding flow chart.

In FIG. 13, when the print buffer is filled with received data (step S100), the phases Sϕ1–Sϕ4 of the stepping motor 22 are magnetized to cause a movement toward right (step S101). This is represented by 50 in FIG. 14.

Then a step S102 identifies whether the heat cycle is of an odd number or an even number. In case of an odd-numbered cycle, a step S107 supplies electric signals to the heating elements DA1–DA8 for the odd-numbered cycle, in the two vertical arrays. The printing operation is conducted by activating the driver 134 through the signal line S2, according to a record pattern. As an examples, in case of printing a character "C", a voltage $V_{AA}$ is supplied to the heating elements DA2–DA6 in a step S108, when the elements DA1–DA8 are positioned on a line 51 shown in FIG. 15. The heating period is measured by a timer t in a step S109, and, after the period, a step S110 terminates the supply of the voltage $V_{AA}$. The pulse to the heating elements and the obtained print as represented by 51 in FIGS. 14 and 15.

Then a step S111 executes a stepwise increment of the print cycle counter.

Subsequently a step S101 causes movement of the recording head 11 by a recording pitch in a direction indicated by an arrow in FIG. 15. Thus the heating elements DA1–DA8 are positioned on a line 52 shown in FIG. 15, while the elements DB1–DB8 are positioned at one pitch to the left of the line 51. In this case the step S102 identifies an even-numbered cycle, and the step S103 drives the elements DB1–DB8 for the even-numbered cycle. However, in case of printing the character "C", there is no record pattern, so that the elements are not activated and the program proceeds to the step S111, for increasing the number of recording cycles. Then the program returns to the step S101 to shift the recording head 11 to the right by a pitch, whereby the elements DA1–DA8 are positioned on a line 53 while the elements DB1–DB8 are positioned on the line 51. Since this is an odd-numbered cycle, the program proceeds to the steps S107–S110 to activate the heating elements DA1 and DA7 to form a record as shown on the line 53 in FIG. 15. Then the step S111 executes a stepwise increment of the number of recording cycles, and the recording head 11 is further moved to the right by one pitch, whereby the heating elements DA1–DA8 are positioned on a line 54 while the elements DB1–DB8 are positioned on the line 52. Since this is an even-numbered cycle, the step S104 activates the heating elements DB1 and DB7 according to the record pattern to obtain a print as shown on the line 52 in FIG. 15. The print is obtained by supplying the heating elements with a voltage $V_{BB}$, which is determined in consideration of the preliminary heating of the thermal transfer ribbon by the upstream heating elements DA1–DA8 with the voltage $V_{AA}$. Then an odd-numbered cycle is conducted to obtain a record on a line 55 as shown in FIG. 15, and an even-numbered cycle is conducted to obtain a record on a line 54.

Figure 14:
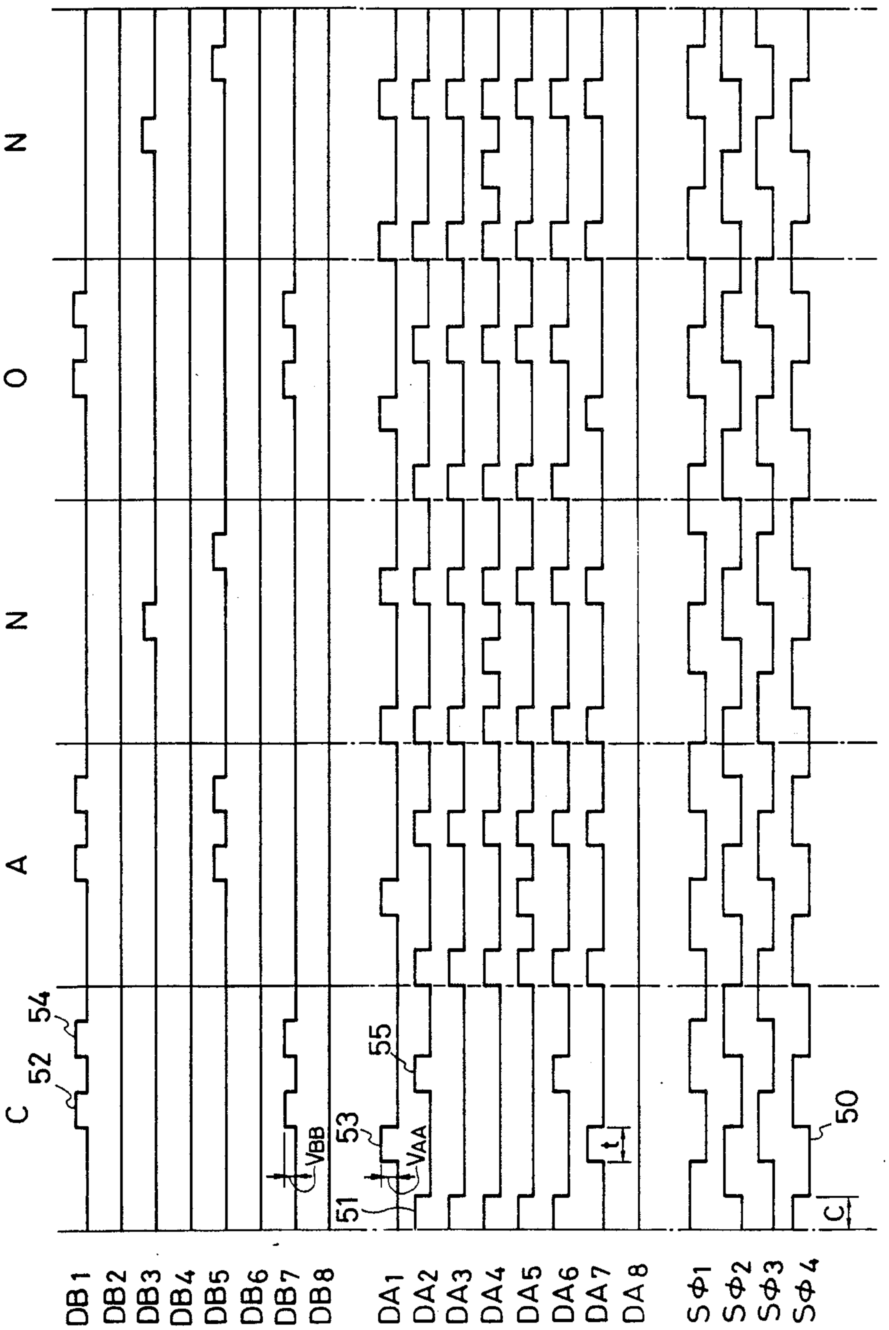
FIG. 14 is a corresponding timing chart.
Figure 15:
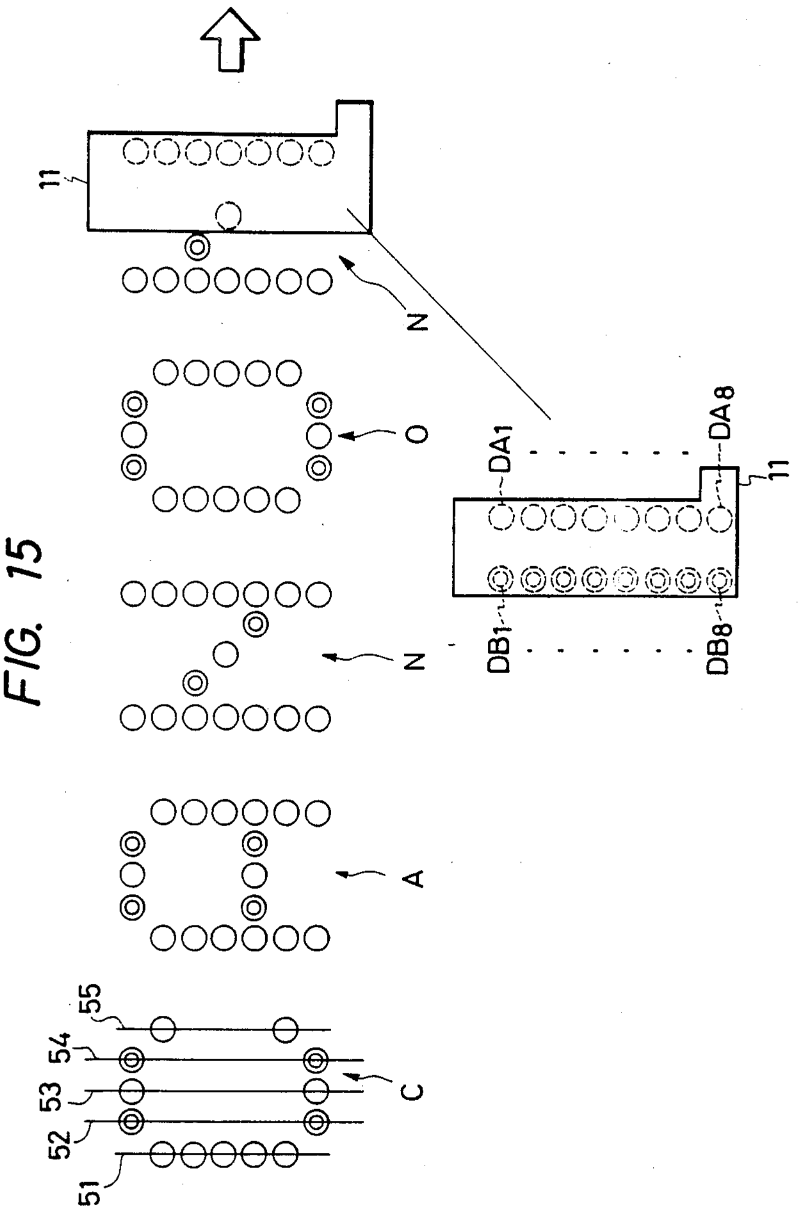
FIG. 15 is a schematic view showing the recording operation with a head.

In this manner the character "C" is printed, and the characters "A", "N", "O" and "N" are then printed in the same manner as shown in FIGS. 14 and 15.

As explained in the foregoing, this embodiment varies the driving voltages for the arrays of the heating elements positioned upstream and downstream in the recording direction, thus reducing the driving voltage for the upstream array in consideration of the preliminary heating of the thermal transfer ribbon by the heating elements of the downstream array, thereby providing a print of an extremely high quality, without fluctuation in the print density among dots. Also high-speed printing is rendered possible through the use of plural arrays of heating elements.

Figure 16:
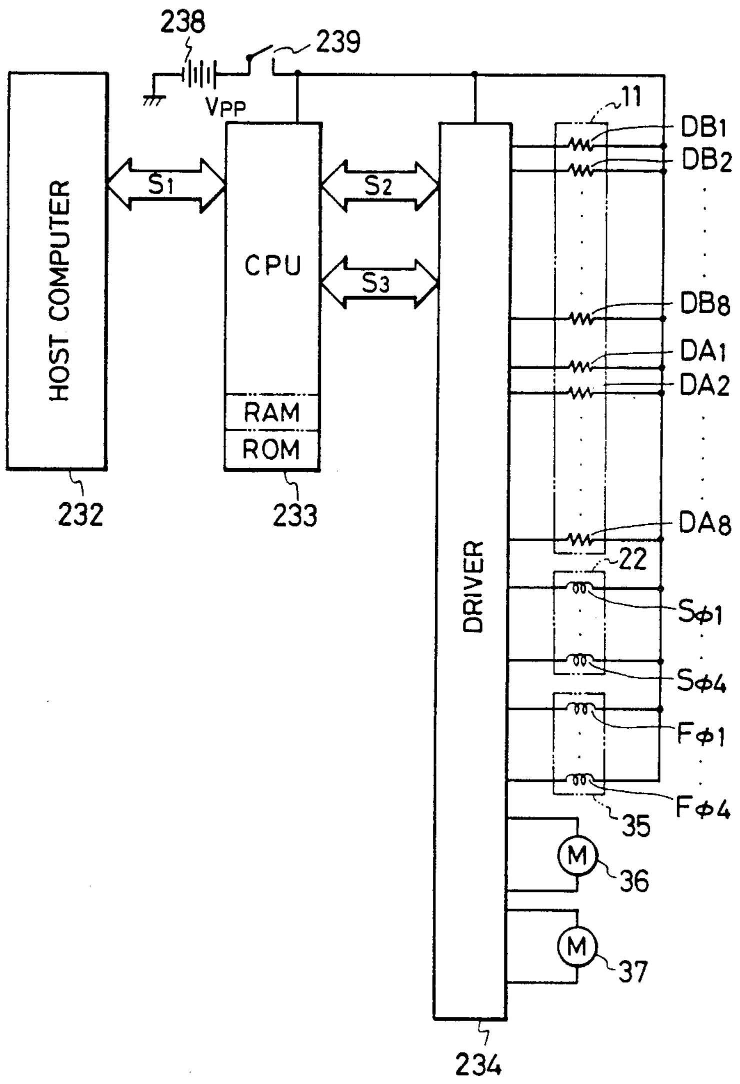
FIG. 16 is a block diagram of still another embodiment.
Figure 17:
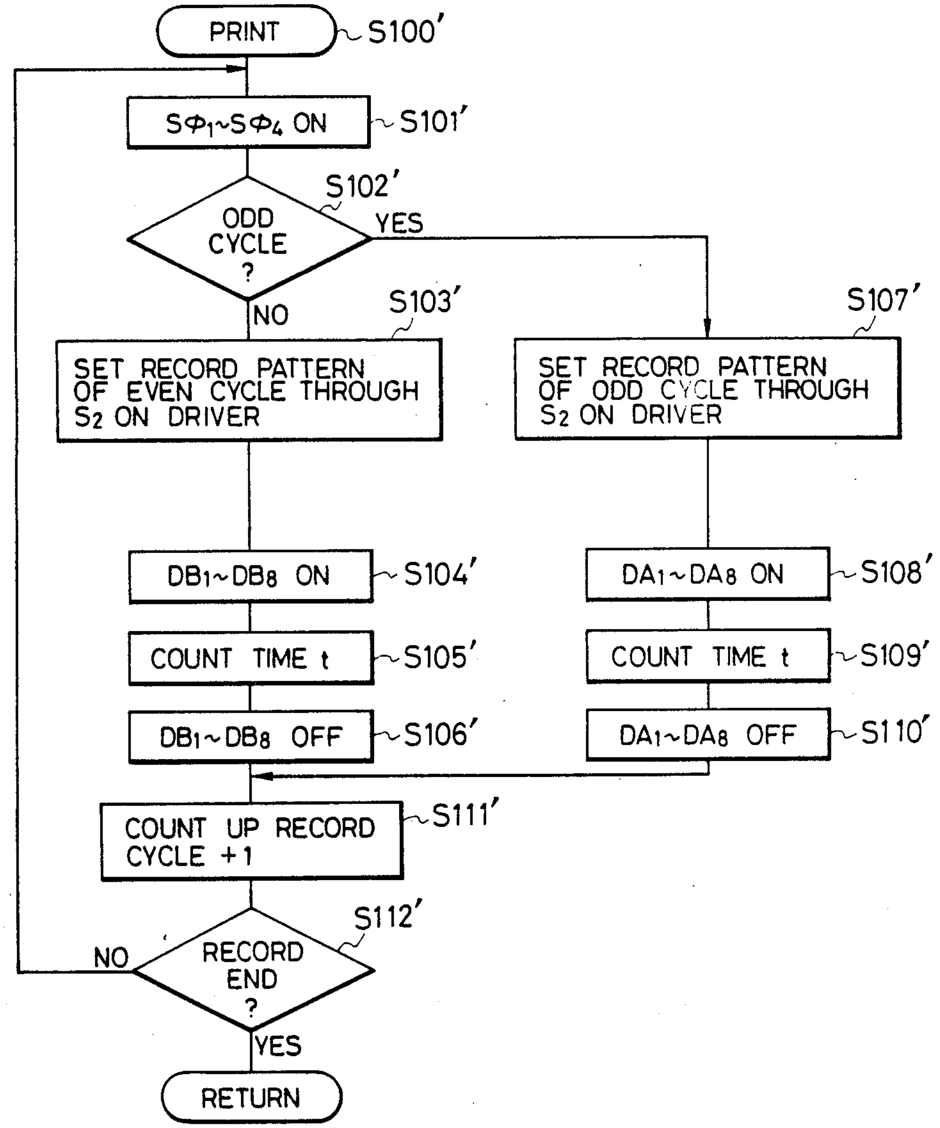
FIG. 17 is a corresponding flow chart.

Now reference is made to FIGS. 16 and 17 for explaining still another embodiment.

In the following embodiment, the amount of heat generated by the array of heating elements, positioned upstream in the recording direction, is selected to be smaller than that generated by the downstream array, in consideration of the preliminary heating of the thermal transfer ribbon by said downstream array. More specifically, in the present embodiment, the driving voltage and the duration of voltage supply are same for both arrays, but the heating elements of the upstream array have a larger resistance than that of the elements of the downstream array, in such a manner the amount of generated heat of the upstream array is smaller, corresponding to the preliminary heating of the ribbon by the downstream array.

FIG. 16 is a schematic block diagram of a control system for controlling the thermal transfer printer of the present embodiment, wherein a host computer 232 and a central processing unit (CPU) 233 are connected by the CPU 233 through signal lines S2, S3. In response to control signals supplied from the CPU 233, the driver 234 controls a recording head 11, a stepping motor 22 for driving a carriages 18, a stepping motor 35 for sheet advancement, a DC motor 36 for elevating or lowering an ink ribbon 16, and a DC motor for taking up the ink ribbon 16. The driver 234 generates various drive signals in response to the signals from the CPU 233. The heating elements DB1–DB8 and DA1–DA8 of the recording head 11 are powered by a power source 238 through a power switch 239. The drive signals from the driver 234 drive the carriage driving stepping motor 22 by activating the phases Sφ1–Sφ4 in succession, also drive the sheet advancing motor 35 by the phases Fφ1–Fφ4 thereof, and further drive the motors 36, 37 for shifting and taking up the ribbon 16.

In the present embodiment the heating elements DB1–DB8 positioned upstream in the recording direction have a resistance $R_B$ larger than the resistance $R_A$ of the elements DA1–DA8 positioned downstream, whereby the difference in the amounts of heat generated by the upstream and downstream arrays $(V^2t/R_A - V^2t/R_B)$ corresponds to the amount of preliminary heating of the ribbon by the elements of the downstream array.

The CPU 233, incorporated in the thermal printer for controlling the driver 234 in response to data signals, is provided with a read-only memory (ROM) for recording operation control, and a random access memory (RAM) utilized as a heat cycle counter, a print buffer, etc.

Figure 18:
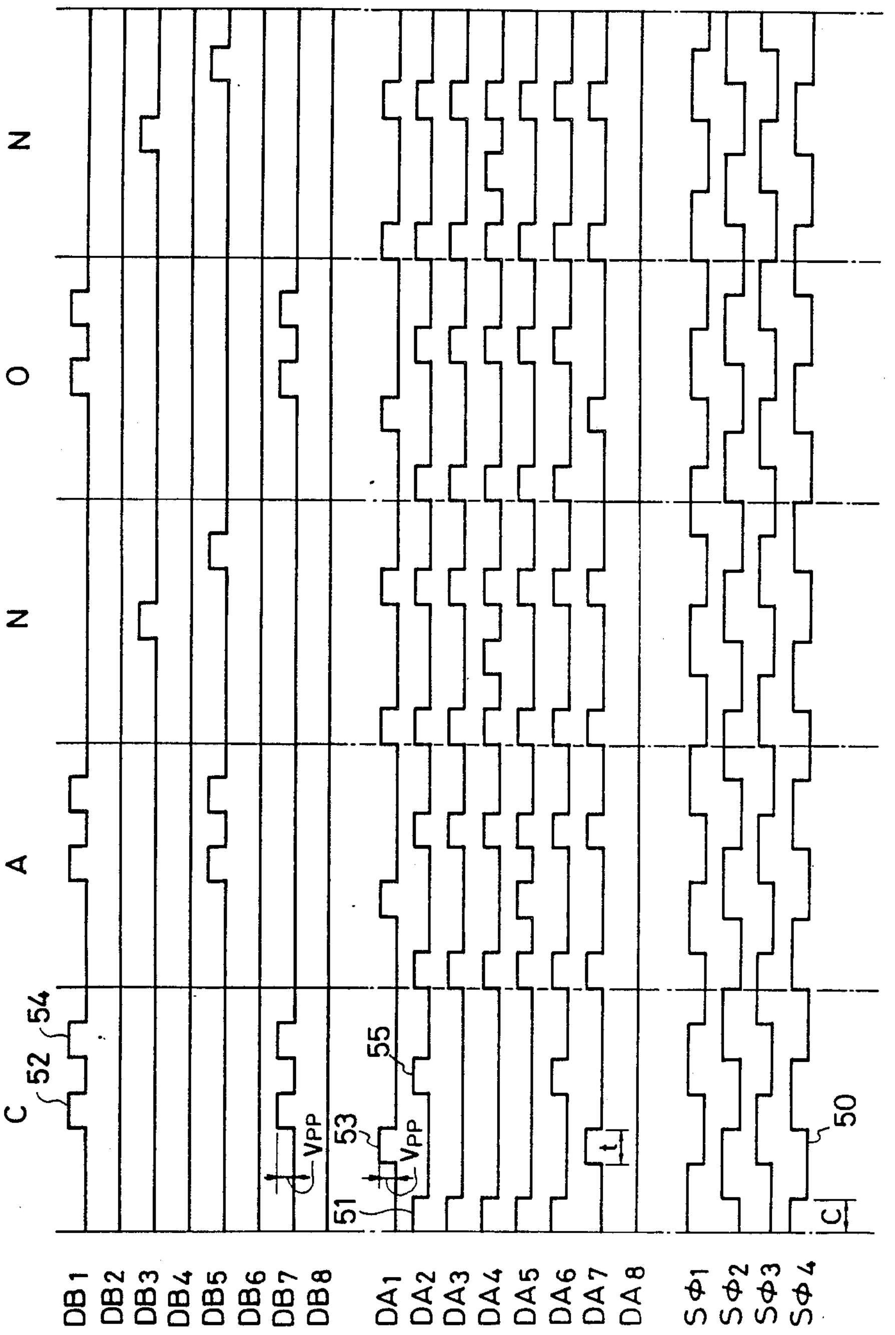
FIG. 18 is a corresponding timing chart.

Now reference is made to FIGS. 15, 17 and 18 for explaining the function of the above-explained thermal printer.

In FIG. 17, when the print buffer is filled with received data (S100′), the phases Sφ1–Sφ4 of the stepping motor 22 are activated to cause a movement toward right (step S101′). This state is represented by 50 in FIG. 18.

Then a step S102′ identifies whether the heat cycle is of an odd number or an even number. In case of an odd-numbered cycle, a step S107′ supplies electric signals to the heating elements DA1–DA8 for the odd-numbered cycle, in the two vertical arrays. The printing operation is conducted by activating the driver 234 through the signal line S2, according to a record pattern. As an example, in case of printing a character "C", a voltage $V_{PP}$ is supplied to the heating elements DA2–DA6 in a step S108′, when the elements DA1–DA8 are positioned on a line 51 shown in FIG. 15. The heating period is measured by a timer t in a step S109′, and, after the period, a step S110′ terminates the supply of the voltage $V_{PP}$. The pulse to the heating elements and the obtained print are represented by 51 in FIGS. 18 and 15.

Then a step S111′ executes a stepwise increment of the print cycle counter.

Subsequently a step S101' caused movement of the recording head 11 by a recording pitch in a direction indicated by an arrow in FIG. 15. Thus the heating elements DA1–DA8 are positioned on a line 52 in FIG. 15, while the elements DB1–DB8 are positioned at one pitch to the left of the line 51. In this case the step S102' identifies an even-numbered cycle, and the step S103' drives the elements DB1–DB8 for the even-numbered cycle. However, in case of printing the character "C", there is no record pattern, so that the elements are not activated and the program proceeds to the step S111', for increasing the number of recording cycles. Then the program returns to the step S101' to shift the recording head 11 to the right by a pitch, whereby the elements DA1–DA8 are positioned on a line 53 while the elements DB1–DB8 are positioned on the line 51. Since this is an odd-numbered cycle, the program proceeds to the steps S107'–S110' to activate the heating elements DA1 and DA7 to form a record as shown on the line 53 in FIG. 15. Then the step S111' executes a stepwise increment of the number of recording cycles, and the recording head 11 is further moved to the right by one pitch, whereby the heating elemtns DA1–DA8 are positioned on a line 54 while the elements DB1–DB8 are positioned on the line 52. Since this is an even-numbered cycle, the step S104' activates the heating elements DB1 and DB7 according to the record pattern to obtain a print as shown on the line 52 in FIG. 15.

In the above-explained recording operation, the amount of heat generated by the heating elements DB1–DB8 of the upstream array, plus the amount of preliminary heating ($V^2t/R_A - V^2t/R_B$) of the ribbon by the elements DA1–DA8 of the downstream array with the voltage $V_{PP}$, is substantially equal so the amount of heat generated in the downstream array.

Then an odd-numbered cycle is conducted to obtain a record on a line 55 shown in FIG. 15, and an even-numbered cycle is conducted to obtain a record on a line 54.

In this manner the character "C" is printed, and the characters "A", "N", "O" and "N" are then printed in the same manner as shown in FIGS. 18 and 15.

As explained in the foregoing, the present embodiment employes different resistances for the arrays of heating elements positioned upstream and downstream in the recording direction in such a manner that the amount of heat generated by the upstream array of the heating elements is made smaller, corresponding to the amount of preliminary heating of the thermal transfer ribbon by the downstream array of heating elements, thereby avoiding fluctuation in the density of dots and allowing to obtain a print of an extremely high quality. In addition a high-speed recording is rendered possible by the use of plural arrays of heating elements.

The embodiment shown in FIGS. 12 to 15 is advantageously applied to a thermal head as shown in FIG. 2(B), and other embodiments is advantageously applied to a thermal head as shown in FIG. 2(A).

Though two arrays of heating elements are employed in the foregoing embodiments, the present invention is not limited to such embodiments but may employ three or more arrays of heating elements;

Also the foregoing embodiments are limited to so-called serial printers in which the recording head is movable, but the present invention is applicable also to so-called full-line printers in which the head is fixed in position. Also the ink sheet need not be a ribbon of a small width but can also be a wide sheet covering the entire recording width. Furthermore, the foregoing embodiments are limited to the use of linear arrays of heating elements, but the present invention is not limited to such embodiments but is applicable also to slightly staggered arrangements of the heating elements.

In the present invention, the recording sheet is not limited to ordinary paper but includes a transparent plastic sheet for use in an overhead projector. Also the recorded image includes letters, numerals, graphs, pictorial patterns etc.

As explained in the foregoing, the present invention provides a thermal printer capable of obtaining improved image quality, by controlling the amount of heat generated by the arrays of heating elements in consideration of the amount of heat accumulated in the ink sheet.

What we claim is:

1. A thermal printer for image recording on a recording sheet by transferring ink from an ink sheet, comprising:

a head comprising a first heating element group including an array of selectively drivable plural heating elements for heating the ink sheet to transfer ink to the recording sheet and a second heating element group including an array of selectively drivable plural heating elements for heating the ink sheet to transfer ink to the recording sheet;

moving means for effecting relative movement of the recording sheet and said head;

actuating means for alternatively actuating said first and second heating element groups as said head and the recording sheet move relative to each other to record the image on the recording sheet in accordance with the particular said heating elements being driven in each said group; and control means for controlling the amount of heat generated by said heating elements of said first heating element group and said second heating element group in accordance with predetermined control information indicative of the amount of heat accumulated in the ink sheet, so that the density of the recorded image is substantially uniform.

2. A thermal printer according to claim 1, wherein said first and second heating element groups are mutually parallel and are perpendicular to the direction of relative movement of the recording sheet and said head.

3. A thermal printer according to claim 1, wherein said control means is adapted to control the drive periods of said first and second heating element groups according to the amount of heat accumulated in said ink sheet.

4. A thermal printer according to claim 1, wherein said control means is adapted to control the drive voltage for said first and second heating element groups according to the amount of heat accumulated in said ink sheet.

5. A thermal printer according to claim 1, wherein said heating element groups are positioned along the direction of relative movement of the recording sheet and said head and said control means is adapted to reduce the drive period for said group positioned upstream in such direction in comparison with the drive period for the other said group.

6. A thermal printer according to claim 1, wherein said heating element groups are positioned along the direction of relative movement of the recording sheet and said head and said control means is adapted to reduce the driving voltage for said group positioned upstream in such direction in comparison with the driving voltage for the other said group.

7. A thermal printer for image recording on a recording sheet by transferring ink from an ink sheet, comprising:

a head comprising a first heating element group including an array of selectively drivable plural heating elements for heating the ink sheet to transfer ink to the recording sheet and a second heating element group including an array of selectively drivable plural heating elements for heating the ink sheet to transfer ink to the recording sheet;

moving means for effecting relative movement of the recording sheet and said head; and actuating means for alternately actuating said first and second heating elements groups as said head and the recording sheet move relative to each other to record the image on the recording sheet in accordance with the particular said heating elements being driven in each group;

wherein said heating elements groups are positioned along the direction of relative movement of the recording sheet and said head, and said group positioned upstream in such direction includes heating elements having a predetermined larger resistance than that of said heating elements of said other heating element group in consideration of the amount of heat accumulated in the ink sheet so that the density of the recorded image is substantially uniform.

8. A thermal printer according to claim 1, wherein a character is printed by the cooperation of said first and second heating element groups.

9. A thermal printer according to claim 7, wherein a character is printed by the cooperation of said first and second heating element groups.

10. A thermal printer according to claim 1, wherein said heating elements of said first heating element group are arranged in corresponding relation with said heating elements of said second heating element group.

11. A thermal printer according to claim 1, wherein said head is moved in across the width recording sheet.

12. A thermal printer according to claim 1, wherein the ink sheet is removably mounted on a mount portion provided on the printer.

13. A thermal printer according to claim 1, wherein the control information indicates whether the preceding array of heating elements were heated.

14. A thermal printer according to claim 7, wherein said heating elements of said first heating element group are arranged in corresponding relation with said heating elements of said second heating element group.

15. A thermal printer according to claim 7, wherein said head is moved across the width of the recording sheet.

16. A thermal printer according to claim 7, wherein the ink sheet is removably mounted on a mount portion provided on the printer.

17. A thermal printer for image recording on a recording sheet by transferring ink from an ink sheet, comprising:

a head having (i) a first printing element array including a plurality of printing elements, arranged transversely of a recording direction at a predetermined interval, for heating the ink sheet to transfer ink to the recording sheet, and (ii) a second printing element array including a plurality of printing elements, arranged in corresponding relation to said respective printing elements of said first printing element array, for heating the ink sheet to transfer ink to the recording sheet;

moving means for effecting relative movement between the recording sheet and said head;

actuating means for alternately actuating said first and second printing element arrays as said head and the recording sheet move relative to each other to record the image on the recording sheet in accordance with the particular said printing elements being driven in each said array; and control means for controlling the amount of heat generated by said printing elements of said first and second printing element arrays in accordance with predetermined control information indicative of the amount of heat accumulated in the ink sheet, so that the density of the recorded image is substantially uniform.

* * * * *

UNITED STATES PATENT AND TRADEMARK OFFICE
CERTIFICATE OF CORRECTION

PATENT NO. : 4,675,700

DATED : June 23, 1987

INVENTOR(S) : KEIJI NAGIRA, ET AL.

It is certified that error appears in the above-identified patent and that said Letters Patent is hereby corrected as shown below:

COLUMN 1

Line 15, "general, conventional" should read --general, a conventional--.
Line 20, "meidum." should read --medium.--.

COLUMN 2

Line 30, "direction in" should read --direction,--.
Line 50, "of" should be deleted.

COLUMN 3

Line 11, "gorup" should read --group--.
Line 27, "thermla" should read --thermal--.

COLUMN 4

Line 13, "oepra-" should read --opera- --.
Line 45, "in the" should read --into--.

COLUMN 6

Line 5, "element" should read --elements--.
Line 58, "CLK4-"OFF" " should read --CLK4="OFF"--.

COLUMN 7

Line 4, "in the even-numbered cycle (2)" should be deleted.

UNITED STATES PATENT AND TRADEMARK OFFICE
CERTIFICATE OF CORRECTION

PATENT NO. : 4,675,700

DATED : June 23, 1987

INVENTOR(S) : KEIJI NAGIRA, ET AL.

It is certified that error appears in the above-identified patent and that said Letters Patent is hereby corrected as shown below:

COLUMN 8

Line 67, "examples," should read --example,--.

COLUMN 9

Line 6, "as" should read --are--.

COLUMN 10

Line 4, "manner the" should read --manner that the--.
Line 15, "carriages" should read --carriage--.

COLUMN 11

Line 34, "so" should read --to--.
Line 57, "is" should read --are--.
Line 62, "elements;" should read --elements.--.

COLUMN 12

Line 31, "alternatively" should read --alternately--.

UNITED STATES PATENT AND TRADEMARK OFFICE
CERTIFICATE OF CORRECTION

PATENT NO. : 4,675,700
DATED : June 23, 1987
INVENTOR(S) : KEIJI NAGIRA, ET AL.

It is certified that error appears in the above-identified patent and that said Letters Patent is hereby corrected as shown below:

COLUMN 13

Line 18, "elements" should read --element--.
Line 24, "elements" should read --element--.
Line 47, "in across the width" should read --across the width of the--.

Signed and Sealed this

Second Day of February, 1988

*Attest:*

DONALD J. QUIGG

*Attesting Officer*

*Commissioner of Patents and Trademarks*